United States Patent [19]

Jestel et al.

[11] Patent Number: 5,396,328
[45] Date of Patent: Mar. 7, 1995

[54] WAVEGUIDE TYPE DISPLACEMENT INTERFEROMETER HAVING TWO REFERENCE PATHS

[75] Inventors: Dieter Jestel, Castrop-Rauxel; Andreas Franz, Kienberg; Dieter Michel, Traunstein, all of Germany

[73] Assignee: Dr. Johannes Heidenhain GmbH, Traunreut, Germany

[21] Appl. No.: 768,217

[22] PCT Filed: Feb. 8, 1991

[86] PCT No.: PCT/EP91/00246
§ 371 Date: Sep. 21, 1992
§ 102(e) Date: Sep. 21, 1992

[87] PCT Pub. No.: WO91/12487
PCT Pub. Date: Aug. 22, 1991

[30] Foreign Application Priority Data

Feb. 9, 1990 [DE] Germany .................. 40 03 855.6

[51] Int. Cl.[6] .............................................. G01B 9/02
[52] U.S. Cl. ......................................... 356/358; 385/12
[58] Field of Search ............... 356/356, 358, 357, 345; 385/12, 14

[56] References Cited

U.S. PATENT DOCUMENTS

| | | | |
|---|---|---|---|
| 4,661,964 | 4/1987 | Haavisto | 372/94 |
| 4,744,661 | 5/1988 | Ulbers et al. | 356/358 |
| 4,759,627 | 7/1988 | Thylén et al. | 356/345 |
| 4,865,453 | 9/1989 | Gidon et al. | 356/358 |
| 4,909,629 | 3/1990 | Yokokura et al. | 356/358 |
| 4,941,744 | 7/1990 | Yokokura et al. | 356/358 |
| 5,187,545 | 1/1993 | Allgauer | 356/358 |

FOREIGN PATENT DOCUMENTS

| | | |
|---|---|---|
| 1154646 | 9/1963 | Germany . |
| 3609507A1 | 10/1986 | Germany . |
| 3615916A1 | 4/1987 | Germany . |
| 3825606A1 | 4/1990 | Germany . |
| 2009396A | 6/1979 | United Kingdom . |

Primary Examiner—Samuel A. Turner
Attorney, Agent, or Firm—Willian Brinks Hofer Gilson & Lione

[57] ABSTRACT

The interferometer comprises a light source, at least one beam splitting means, a beam combiner means, measuring and reference arms as well as wave guides for guiding the light to the beam splitting means and for guiding the light back to photodetectors. Beam splitting means and beam combiner means are formed by integrated optics elements on a substrate. The wave guides on the substrate form a measuring arm ($7_1$) and two reference arms ($6_1$, $8_1$) which have different optical path lengths for setting a phase difference. An evaluation electronics for determining correct as to signs, the change in optical path length in the measuring arm ($7_1$) is connected to the photodetectors.

7 Claims, 7 Drawing Sheets

WAVEGUIDE TYPE DISPLACEMENT INTERFEROMETER HAVING TWO REFERENCE PATHS

The invention relates to an interferometer according to the preamble of the claim as well as a method for determining correct as to signs, the change in the optical path length with the aid of said interferometer.

A Michelson interferometer which is built in the manner of integrated optics is described in German disclosure letter 38 25 606. The interferometer consists of a monochromatic laser light source, a beam splitting means, a reference mirror and a measuring mirror as well as light guide fibers for guiding the light to the beam splitting means and for guiding the light carrying the measurement signal back to a detector. Therein, the beam splitting means is formed by an integrated-optical, symmetrical coupling capacitor in a glass substrate in which wave guides produced by struturated ion exchange are arranged, which on one hand form the measuring arm and on the other hand the reference arm of the interferometer.

The invention, therefore, is based on the object of giving an interferometer of the kind cited in the beginning, such a design that it is capable of proving optical path lengths changes with high resolution and determined as to direction in a simple and reliable manner.

The invention solves said object with the aid of the features of the characterizing clause of claim 1. Advantageous embodiments of the invention are subject of the subclaims. Furthermore, a method is stated which, with the aid of the interferometer according to the present invention, renders possible the measurement of optical path lengths changes determined as to direction and with great accuracy.

With the aid of the interferometer according to the present invention and the method according to the present invention, respectively, it is, thus, possible to carry out high-resolution position measurements as well as to determine changes in the refractive index. By the combination of counting methods and single-sideband modulation, therefore, also large path distance changes can be quickly displayed in a manner determined as to directions (counting method) and the exact value of the optical path distance change or the change in refractive index, respectively, can be recognized (single-sideband method).

Embodiments of the invention now are described with reference to the attached drawings. Therein.

In the following at first quite in general, an embodiment of a Michelson interferometer according to the present invention is described. In the interferometer, serveral beam splitting means are provided for in the glass substrate so that one common arm as measuring arm and two arms as reference arms will result. In the common arm for example the light of a helium-neon laser is coupled in through a wave guide, preferably a glass fiber. Subsequent to the coupling-in point the measuring arm separates into two wave guide structures running in the same direction as the reference arms and which are guided to meet again in the further course. Thus, two Y-shaped branchings are formed, in which the light is first separated and then combined, respectively. Thus, two direction couplers (3 dB) are formed which serve as beam splitting means. The reflected light from the reference mirrors which, for example, consist of aluminum deposited on the wave guide end faces, interferes with the light reflected from the object mirror. The interference signals are supplied to two detectors via multiple-mode fibers coupled to the front face of the substrate. A thermo-optical modulator on one of the two reference arms pemits the setting of 90° phase difference between the two reference arms, whereby a quick forward/backward direction recognition is effected. For the purpose of setting of a 90° phase difference, several methods are at offer. One method consists in that the thermo-optical modulator is driven by direct voltage. In a passive method, the properties of the wave guide are affected by a defined deposition of layers, so-called over-layers. This is done by deposition of suitable substances, like adhesives for example or by evaporation or sputtering of silicon oxide layers for example. The desired phase displacement is thus set already during the manufacture of the chips. In another passive method, a thin layer is removed above the wave guide in order to affect the properties of the wave guide. Furthermore, the properties of the wave guide may be influenced by dimensioning such as the width or density of the waveguide.

The thus manipulated signals are supplied by the detectors to the evaluation electronics described later. Therein, two evaluation processes are carried out in parallel. The "strip counting" with orthogonal detector signals is combined with a phase measurement by optical superposition reception. Changes in path length with a resolution corresponding to a fraction of the wavelength (λ/n) and direction detection are found with the quadrature signal and the counting method. High resolution phase detection (e.g. λ/100) is carried out using single-sideband modulation.

For being able to detect quick movements of the object mirror, the peak values of a detector signal are counted. This counting mode corresponds to counting rings in a classical interferometer. In case of such a classical arrangement, the direction of movement is recognizable from the converging and diverging of the rings and/or from the signal curve, of two detectors displaced by ¼ ring breadth. In the case of intergrated optics arrangement only single-mode wave guides are used and there is only one intensity modulation. In the abovedescribed passive measuring method, direction detection is obtained by the one of reference arms being shifted in phase by 90° with respect to the other reference arm. A detector signal provides the counting pulses for the counter, the second detector signal is orthogonal with respect thereto and determines the counting direction resulting from the direction of movement of the measuring mirror.

The high-resolution evaluation of the mirror position is effected by means of single-sideband modulation through the use of an thermo-optical modulator in the measuring arm of the interferometer. By the optical interference method, the optical phase rotation being proportional to the change in distance, is converted into a low-frequency electrical phase rotation. The phase found using a commercial phasemeter can be measured to about 1°. This corresponds to a resolution in the change in distance of about 1 nm, depending on the wavelength of the light source.

Now, a more detailed account is made of the counting process.

A quick forward/backward recognition (direction discrimination) and measuring value detection is achieved by the counting method. We start on the assumption that the detector signals are mutually shifted in phase by 90°. On the integrated optics chip two detector signals are directly generated. For bringing their power characteristic into a phase difference of 90° with respect to one another, a thermo-optical modulator is operated for example with direct power. The phase difference is adjusted with an oscilloscope. The detector signals thus set orthogonally, serve for forward-/backward recognition or direction discrimination, respectively. The direction signal is passed to the counter as TTL signal. The signal of a detector is delivered to the counter in form of spike pulses. Without single-sideband modulation this arrangement is sufficient. If the phase shifter in the upper reference arm is replaced by the above-stated passive methods such as a deposition, the interferometer sensor is to be operated—as has already been mentioned—completely without electrical connection.

For the higher resolution, phase shifter in the measuring arm is controlled by a function generator and amplifier. In this case the modulation is carried out with a frequency of 1 kHz. As the phase shifter operates on the measuring arm of the interferometer, the phase modulation acts on both reference arms equally. The counter follows the one (1) kHz modulation without problems. Therein, continuous units corresponding to fractions of the wavelength ($\lambda/n$) are counted in upward and downward directions in correspondance to the $2\pi$ modulation for the single-sideband method. Thus the last digits of the display are jumping and cannot be read by the eye. For the purpose of measuring value representation on the digital display with e.g. $\lambda/n$, for example a resolution of the lower digits are written into a memory under trigger control of the function generator. Thus, the display is coupled to a definite phase of the dynamic phase shifter in the measuring arm.

In the evaluation unit the direction of movement of the measuring mirror is additionally displayed with light emitting diodes which are connected to the forward/backward recognition. This signal permits to effect oscillation peak measurements in simple manner in that it is put on the gate of a counter.

In the single-sideband method the phase-modulated single-sideband detection linearly transfers peak and phase of an optical signal into a low-frequency peak and phase which are measured separately from one another. In case of a sufficient single-sideband modulation there is a strict frequency shift. A modulation is impressed onto the optical carrier such that one sideband just disappears. Thus it is possible to convert the optical phase into a electrical phase measurement more easily.

As the phase shift of a themo-optical modulator is not linearly correlated to the control signal, the possibility of an electrical phase readjustment in the measuring arm of the interferometer is not realized. The $2\pi$ disconuities, too, have a disadvantageous effect on the controller. As, here, it is the matter of power-controlled thermo-optical modulators, a phase following action is too sluggish and the thermal load imposed in the chip would depend on the measuring phase. For the above reasons, an evaluation of the relation in phase between measuring arm and reference arm is designed such that the single-sideband modulator continuously runs with the same selection function, that it does not disturb the counting mode of the interferometer and due to the electric output constant to each modulation period, leaves the interferometer in thermal equilibrance. The phasemeter compares the phase of the light in the measuring arm with the one of the reference arm and displays it in digital manner.

For the measuring accuracy endeavoured, the single-sideband method requires an accurate setting of the phase swing. In thermo-optical phase modulators the modulator characteristic has to be included into the calculation of the selection function.

In single-sideband suppression, there are analogue and digital modulation functions. In analogue manner the single-sideband modulation can be effected by a saw-tooth like control of the modulator. One sideband can thereby be suppressed completely. The relating frequency is filtered out by means of a band-pass filter connected subsequently to the detector. If the single-sideband suppression is not complete, this will reduce the accuracy of phase measurement. In this analogue method, the peak phase swing has to be met with high exactness for observing a sufficiently high single-sideband suppression and thus achieving a high accuracy.

This saw-tooth like modulation function, however, can be replaced by a stepped digital modulation function with a $2\pi$ phase rotation within one period. Digital control funtions provide the advantage of being realizeable with processor controls.

Furthermore, there are digital modulation functions which run in a meander form around a saw-tooth like curve and thus tolerate deviations of the peak phase swing from the optimum value. This function is clearly less sensible with respect to deviations from the optimum function curve.

In the evaluation electronics the modulation voltages of the individual steps are adjustable, which then are switched to the phase modulator in alternating manner. The repetition frequency therein amounts to 1 kHz. A free adjustability of the selection steps for the thermo-optical modulators is carried out either by a potentiometer adjustment for each step and the respective phase swing or by a processor with D/A converter and software-controlled step function. Thereby account is taken for the behavior of the thermo-optical modulator. On one hand the optical phase rotation is proportional to the supplied electrical power and thus proportional to the square of the applied voltage, on the other hand the resistance of the heating electrode can be independant from temperature. With adjustable steps, suitably predistorted signals of the function generator may be made use of.

In the following the embodiments shown in the drawings are described in detail.

Figure 1:
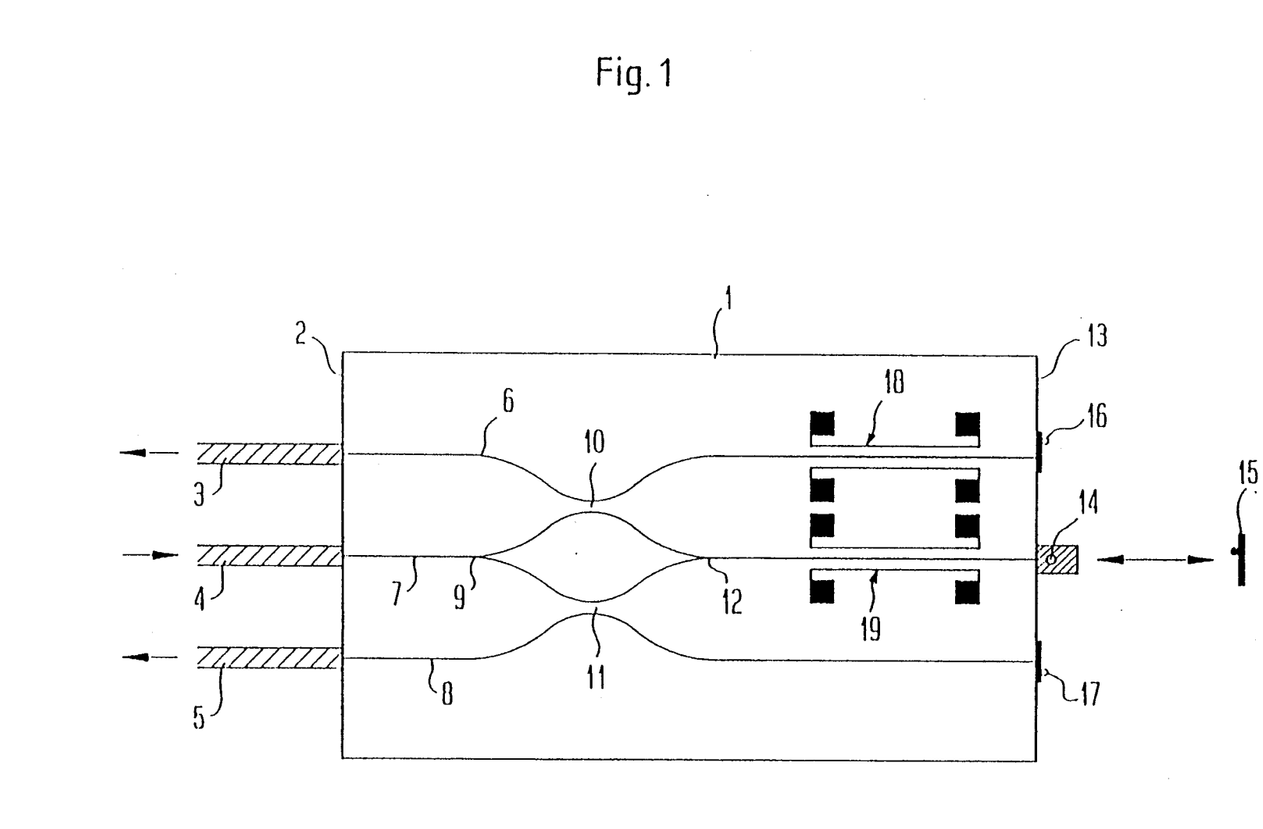
FIG. 1 shows the schematical construction of an integrated optics Michelson interferometer.

The embodiment of the interferometer under FIG. 1 comprises a glass substrate 1. Therein, three light guide fibers 3, 4, and 5 are coupled, e.g. glued, to the front face 2 of the substrate 1, wherein the light guide fiber 4 serves for the light originating from a laser (not shown) and the light guide fibers 3 and 5 lead to one photodetector (not shown) each. In the substrate 1 the light is guided in wave guides 6, 7 and 8 which have been prepared by a field-supported exchange of potassium ions. The ion exchange is carried out for example with a supporting electrical field of 50 V/mm and at a temperature of 450° C. The ion exchange using typical exchange periods of 10 sec is charge-controlled in order to guarantee a reproducable wave guide generation. The strip-type wave guides are dimensioned for a single-wave operation at the wavelength $\lambda=0.633$ $\mu$m. The wave guide 7 split into two arms at 9, which arms approach the wave guides 6 and 8 at 10 and 11 and are led together again at 12. The measuring arm $7_1$ of the wave guide 7 ends at the front face 13 of the substrate 1 in front of a rate-of-change index lens 14 which is directly glued to the end face 13 of the substrate 1 the measuring arm $7_1$ for colliminating the light. An object mirror 15 is disposed at a distance from lens. The wave guides 6 and 8 approach wave guide 7 at 10 and 11. The reference arms $6_1$ and $8_1$ of the wave guides 6 and 8 end at the end face 13 of the substrate 1 in front of reference mirrors 16 and 17 deposited on the end face 13 of the substrate 1. The light coming from the laser and coupled into wave guide 7 by the light guide fiber 4 is split in the two direction couplers 10 and 11. The reflected light from the reference mirrors 16 and 17 interferes with the light reflected from the object mirror 15 at 10 and 11. The interference signals are supplied to the two photodectectors through the multiple-mode fibers 3 and 5 coupled to the front face to the substrate. A thermo-optical modulator 18 on the reference arm $6_1$ permits the setting of 90° phase difference between the two reference arms $6_1$ and $8_1$, whereby a quick forward/backward recognition can be effected. At the level of the thermo-optical modulator 18 another thermo-optical modulator 19 for high-resolution measurements by means of phase modulation and single-sideband detection is disposed on the measuring arm $7_1$. The heating electrodes of the thermo-optical modulators 18 and 19 consist of an evaporated aluminum layer of 400 nm thickness. The electrodes are structured in a photolitographical way with a conductor width of 4 $\mu$m, a length of 7 mm and a mutual distance of 6 $\mu$m.

Figure 2:
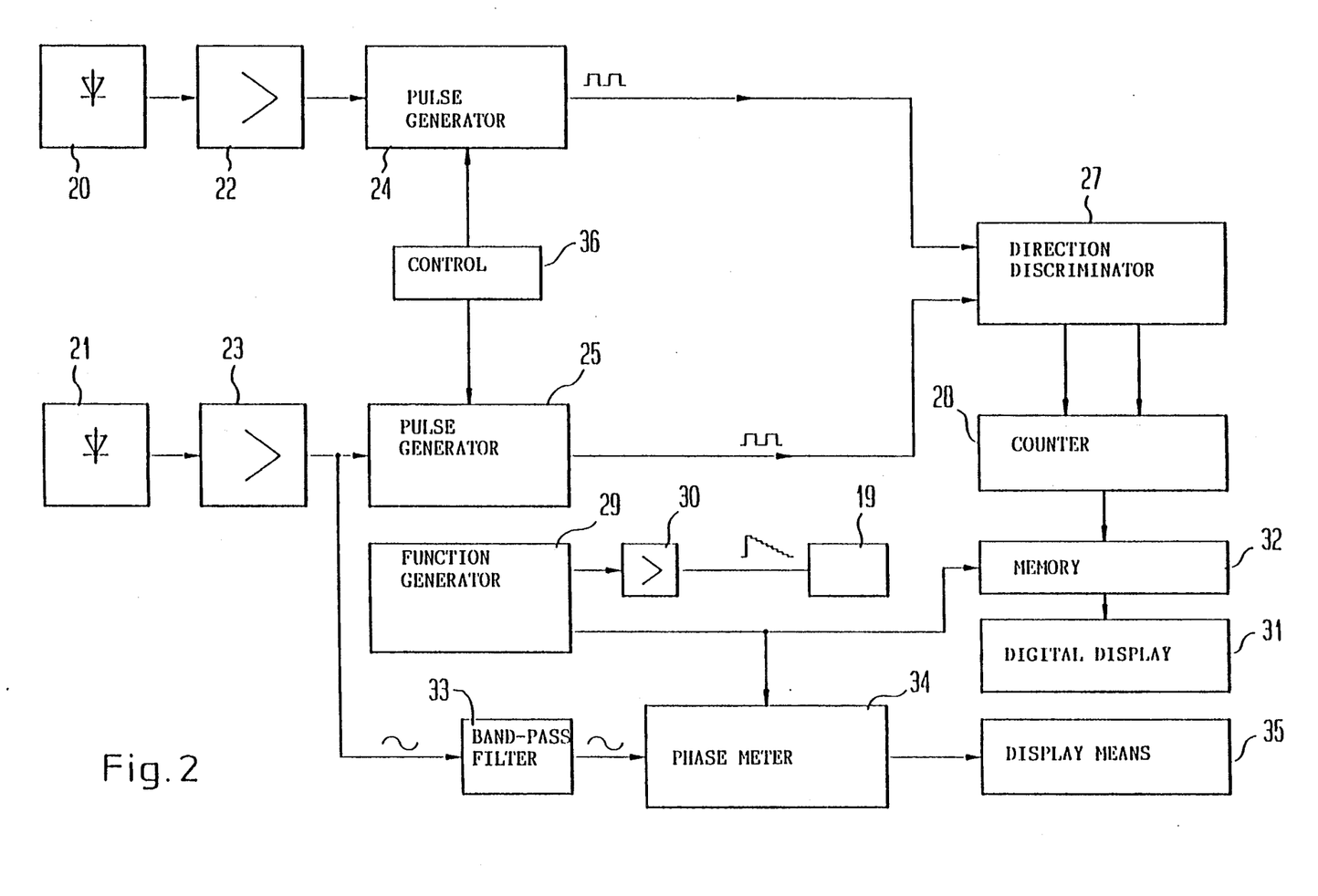
FIG. 2 shows the switching plan of evaluation electronics.

The signals supplied by the light guide fibers 3 and 5 to the photodetectors 20 and 21 are further processed with the aid of an evaluation electronics schematically shown in FIG. 2. Both detector signals are pre-amplified in the amplifiers 22 ad 23 and are supplied to a pulse former 24, 25 (Schmitt trigger) in which the arriving signals are converted into rectangular pulses. In a direction discriminator 27 the signal is converted into spike pulses by one of the two pulse generators 24, 25 and supplied to a counter 28. By comparing the signals of the two pulse generators 24, 25, the direction discriminator 27 decides whether the displacement of the mirror is a forward or backward motion, and issues a signal V/R to the counter 28.

For the higher resolution, the thermo-optical modulator 19 is selected through a function generator 29 and a subsequent amplifier 30. As the modulator 19 is located on the measuring arm $7_1$ of the interferometer, the phase modulation acts on both reference arms $6_1$, $8_1$ equally. The modulation in this case is carried out at a frequency of 1 kHz which can easiliy be followed by the counter 28. Therein it is continuously counted in upward and downward directions in $\lambda/n$ units corresponding to the $2\pi$ phase modulation for the single-sideband method. For measuring value representation on a digital display 31 with $\lambda/4$ resolution, the two lower digits are written into a memory 32 in triggered form by the function generator 29. Thus, the display is coupled to a defined phase of the dynamical phase shifter, i.e. the thermo-optical modulator 19. The frequency shift in the measuring arm $7_1$ is effected with the aid of the thermo-optical modulator 19 by means of single-sideband modulation. The modulation is carried out in such a manner that in the spectrum produced around the carrier frequency one of a pair of sidebands disappears. Therein, there exist analogue and digital modulation functions for the single-sideband suppression. In analogue manner the single-sideband modulation can be carried out by a saw-tooth like selection of the modulator 19. One sideband can thereby be suppressed completely. The relating frequency is filtered out by a band-pass filter 33 connected subsequently to the detector 21.

The saw-tooth like modulation function can, however, also be replaced by a stepped digital modulation function with a $2\pi$ phase rotation within one period.

In the evaluation electronics, the modulation voltages of the individual steps are adjustable, which then are switched to the phase modulator 19 in an alternating manner. The repetition frequency therein is 1 kZh. A phasemeter 34 which also is connected to the function generator 29, compares the phase of the light in the measuring arm $7_1$ to that of the reference arm $8_1$ and displays it in digital form in the display unit 35.

The control 36 shown in FIG. 2 in case of single-sideband method serves for producing accurate rectangular pulses by readjusting the pulse generators and amplifiers, respectively.

The display 31 thus shows the change in the optical path determined as to directions with $\lambda/n$ accuracy, while the display 35 adds the exact intermediate value. The two displays 31 and 35 can be combined into one single display by means of a microprocessor.

A further embodiment of the invention results when a window is formed on the measuring arm $7_1$, which window carries a layer being chemically affectable. This enables the direct proof of certain gases. Such arrangement, however, is already known for a Mach-Zehnder interferometer, but the apparatus provides the disadvantage that it cannot be seen whether the refractive index increases or decreases. With the aid of the described construction of the interferometer, however, it is possible to exactly determine this item, too.

Figure 3:
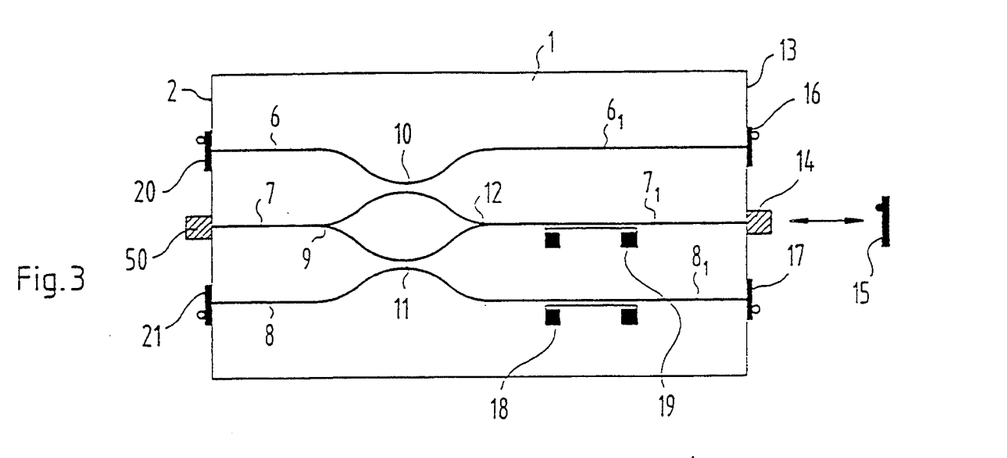
FIG. 3 shows a variation of a Michelson interferometer with direct illumination.

FIG. 3 shows a variation of the interferometer according to the present invention. In contrast to the embodiment under FIG. 1 a light source 50 and photodetectors 21, 22 are disposed directly at the front face 2 of the substrate 1.

Figure 4:
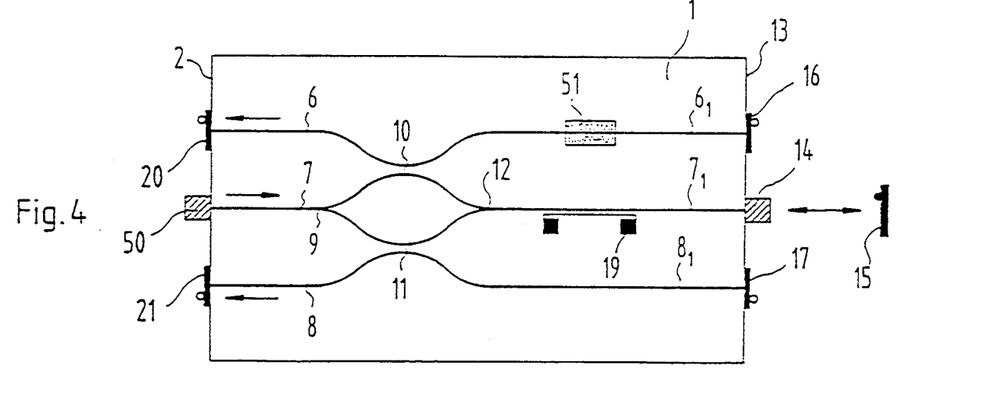
FIG. 4 shows a variation of a Michelson interferometer with passive phase modulator.

In the embodiment of FIG. 4 the adjustment of the phase difference between the two reference arms $6_1$, $8_1$ is carried out in a passive manner by a transparent layer 51 applied to the reference arm $6_1$. For this purpose, for example, evaporated or sputtered organic layers, like SiO$_2$, MgF$_2$ may be used as well as polymers. The same effect is obtained by removing a defined layer 51 above the reference arm 6$_1$.

Figure 5:
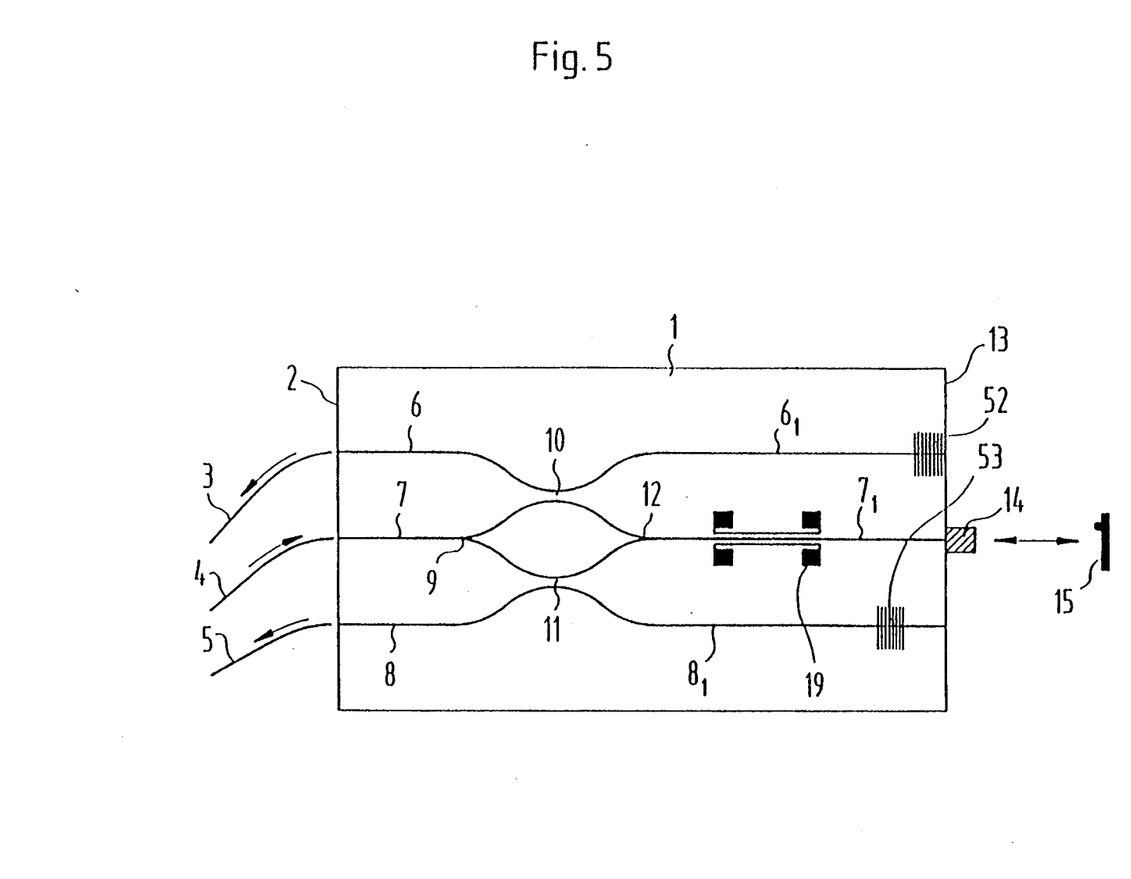
FIG. 5 shows a Michelson interferometer with Bragg reflectors.

FIG. 5 shows a further embodiment of a Michelson interferometer in which so-called Bragg grids 52, 53, like those which also are used in laser diodes for example are applied to the reference arms 61, 81 instead of the mirrors 16, 17 at the reference arms 6$_1$, 8$_1$ as shown in FIG. 1. The desired phase difference between the reference arms 6$_1$, 8$_1$ herein is set by means of the different positions of the Bragg grids 52, 53 and thus by means of the different lengths of the reference arms 6$_1$, 8$_1$.

Figure 6:
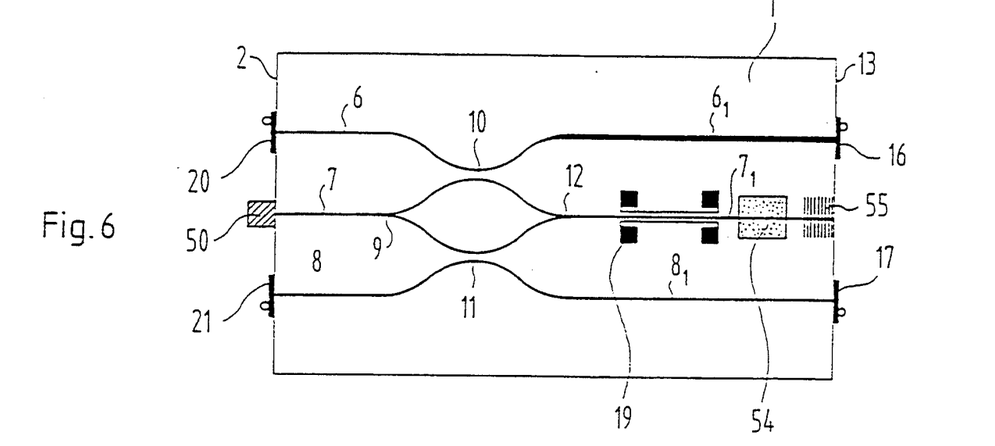
FIG. 6 shows an interferometor as gas sensor.

A different optical length of the two reference arms 6$_1$, 8$_1$ can—as is schematically shown in FIG. 6—also be achieved by a diffent breadth of the reference arms 6$_1$, 8$_1$. In the example of FIG. 6, the reference arm 6$_1$ is broader than the reference arm 8$_1$. As the effective refractory index valid for the propagation of light in the wave guide depends on the breadth of the wave guides, both reference arms 6$_1$, 8$_1$ have different optical length in spite of their identical geometrical lengths. FIG. 6 furthermore shows the use of an embodiment of the interferometer according to the present invention, of the Michelson type as sensor for example for gas. The geometrical length of the measuring arm 7$_1$ here remains constant. The reflector used in the above-described embodiment, at the end of the measuring arm 7$_1$ is replaced by a stationary Bragg grid 55 on the measuring arm 7$_1$. A sensor layer 54 deposited on the measuring arm 7$_1$ changes its refractory index in dependance on the concentration of a gas to be measured or a liquid to be measured and thus causes a change in the optical path distance in the measuring arm 7$_1$, which change is detected.

Figure 7:
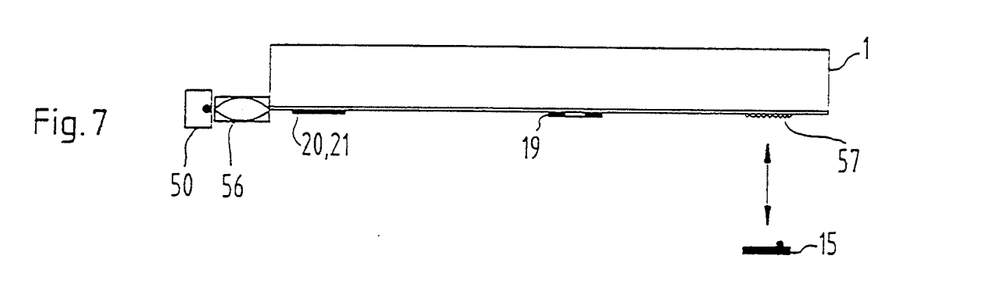
FIG. 7 shows a Michelson interferometer with decoupling gate in side view.
Figure 8:
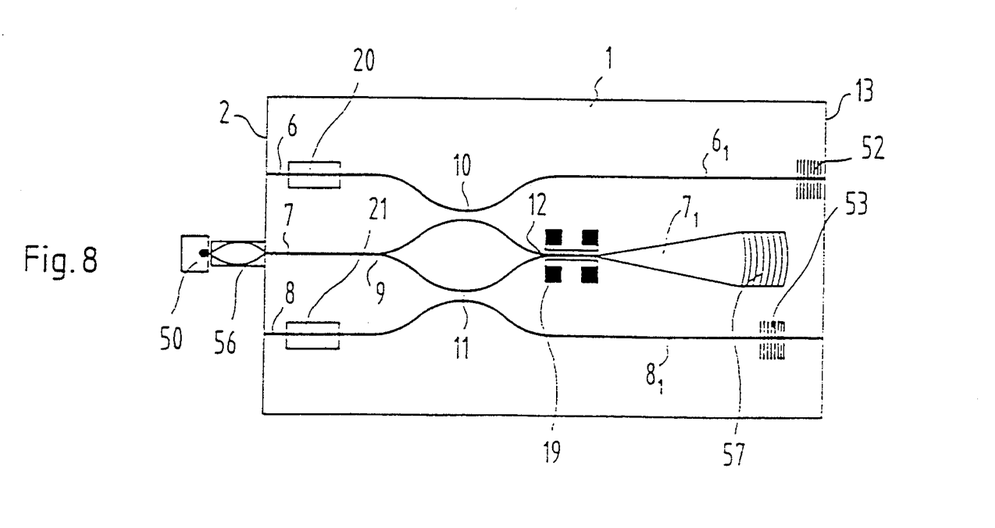
FIG. 8 shows a Michelson interferometer with decoupling gate in top view.

FIGS. 7 and 8 show a further embodiment for an interferometer of the Michelson type. The laser light source 50 is coupled in through a gradient index lense 56 (so-called GRIN lens) into the wave guide 7. The photodetectors 20, 21 in this case are not glued to the front face 2 of the substrate but are applied to the surface of the wave guides 6, 8. The decoupling of the light into the measuring path bordered by the substrate 1 and the reflector 15 in this case is not effected through a front-face mounted collimator electronics 14, but with the aid of a planar, focussing grid 57. The grid 57, which for example is made of TiO$_2$, forms the light leaving the measuring arm 7$_1$ into a collimated light bundle which again is coupled back into the measuring arm 7$_1$ after having been reflected at the measuring mirror 15 through the same grid 57.

Figure 9:
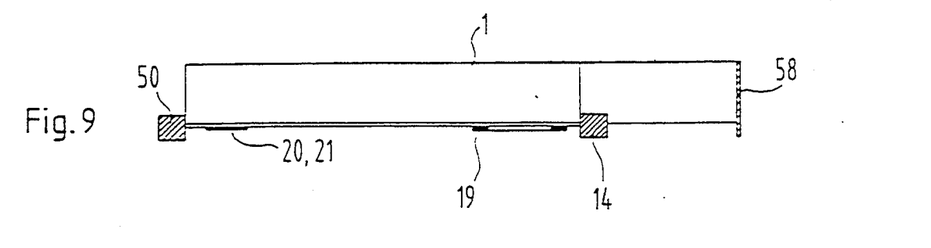
FIG. 9 shows a refractometer in side view.
Figure 10:
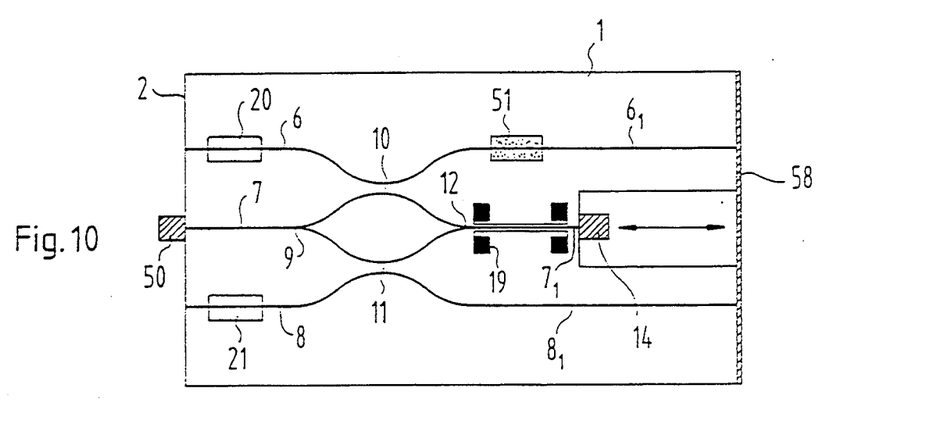
FIG. 10 shows a refractometer in top view.

FIGS. 9 and 10 show a utilization of an embodiment of the interferometer of the present invention as refractometer by means of which the refractory index of the ambient air can be measured. The geometrical length of the measuring path consisting of the measuring arm 7$_1$, the collimator lens 14, an air distance and a fixed end mirror 58, remains constant. The end mirror 58 extends over the ends of the reflector arms 6$_1$ and 8$_1$. A change in the refractory index of the air causes a change in the optical path length in the measuring arm 7$_1$ without influencing the reference arms 6$_1$, 8$_1$. Using the measured change in optical path length, the change in the refractory index of the air can be detemined without ambiguitiy.

Figure 11:
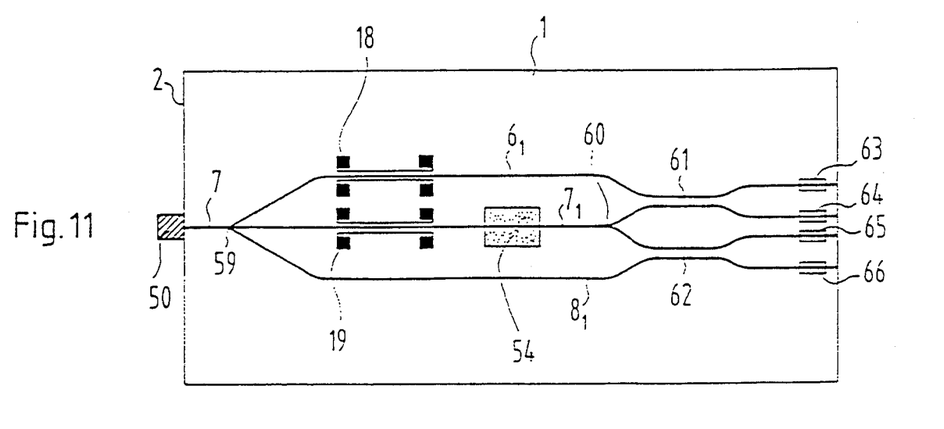
FIG. 11 shows a double Mach-Zehnder interferomter as sensor.

FIG. 11 shows an embodiment of the interferometer of the present invention as Mach-Zehnder interferometer with two reference arms 6$_1$, 8$_1$. In a beam splitting means 59 the light is distributed to the measuring arm 7$_1$ and the two reference arms 6$_1$, 8$_1$. Here, too, the phase difference between the two reference arms 6$_1$, 8$_1$ again is set with the aid of an active (e.g. thermo-optical) or passive (transparent layer) phase modulator 18. The value to be measured, like for example gas concentration in case of use as gas sensor, influences via the sensor layer 54 the optical path length of the central measuring arm 7$_1$. The light of the measuring arm 7$_1$ is split by a beam splitting means 60 and interferes with one direction couplers 61, 62 with the light of the corresponding reference arms 6$_1$, 8$_1$. Each direction coupler 61, 62 has two outputs the light of which is supplied to photodetectors 63, 64, 65, 66. In this way counterclock signals are obtained which can advantageously be used (by subtraction) for suppressing a fraction of equidirected light. However, it is also possible to use one simple beam combiner each for the measuring arm 7$_1$ and the reference arms 6$_1$, 8$_1$ in connection with only one photodetector instead of said two directional couplers 61, 62.

Figure 12:
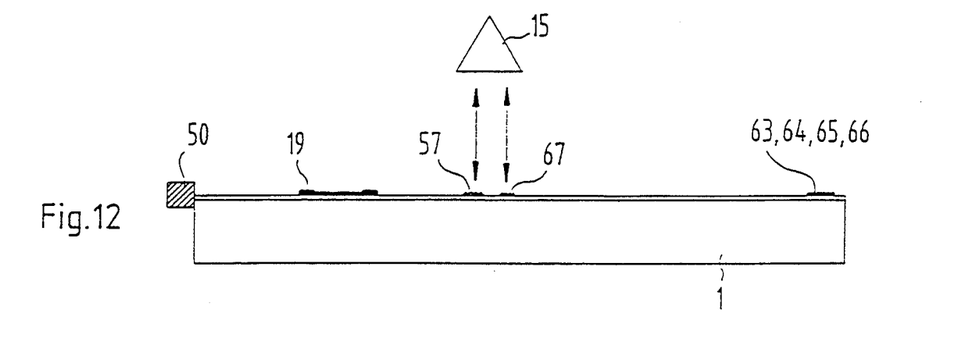
FIG. 12 shows a double Mach-Zehnder interferometer for distance measurement in side view.
Figure 13:
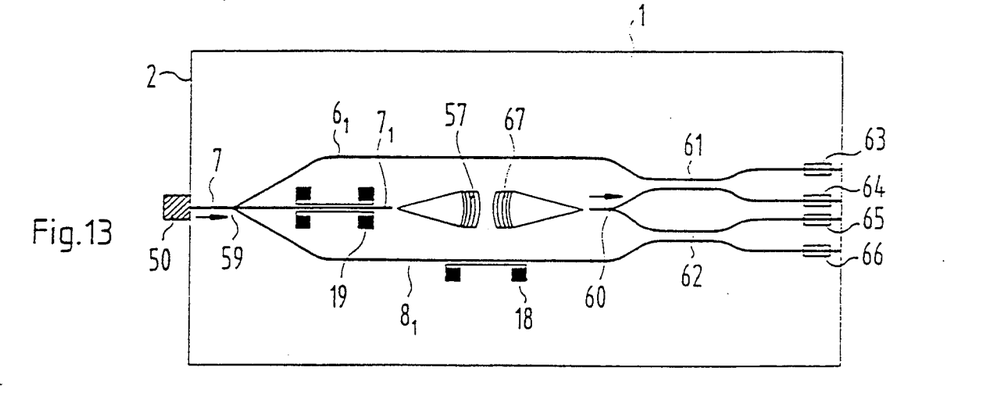
FIG. 13 shows a double Mach-Zehnder interferometer for distance measurement in top view.

FIGS. 12 and 13 show a double Mach-Zehnder interferometer similar to that of FIG. 11, which however in this case serves for path measurement. A first coupling grid 57 forms the light of the measuring arm 7$_1$ into a collimated beam bundle which is reflected by a measuring reflector 15 in laterallly displaced manner and again is coupled back into the measuring arm 7$_1$ through a second focussing grid 67. In this way the position of the measuring reflector 15 can be determined.

In multiple aspects the invention is not limited to the special technical means described in connection with the embodiments. Thus, it is not absolutely necessary to use a laser light source as light source for the interferometer. It is generally known that there is a relation between the path length to be measured by the interferometer and the coherence length of the light of the light source used. In many cases of use, therefore, the light of so-called super luminescent diodes, for example, provides a sufficiently long coherence length capable of carrying out the measurement. Depending on the case of use, therefore, also other light sources having light with a sufficient coherence length can be used. For the substrate and the wave guides formed thereto, also other materials can be used than glass with wave guides produced by ion exchange. For example, lithium niobate may be used as substrate, wherein the wave guides in these crystals have been produced by titanium diffusion or proton exchange, III–V semiconductors may be used as substrate, in which the wave guides including so-called Rib wave guides have been produced by doping, or semiconductor substrates, for example from silicon, may be used as substrate on which the wave guides are produced via an oxide layer, for example silicon oxide, by glass or an organic matter. Instead of the thermo-optical phase modulators mentioned in connection with the embodiments, it also is possible to use electro-optical phase modulators, if the material of the wave guide to be influenced shows electro-optical activity, i.e. shows an electro-optical effect sufficient for the phase modulation, when an electrical field is applied to the wave guide. In these cases, the electrical field is generated by to electrodes between which the wave guide extends and which are connected to a voltage source. Phase modulators of that kind are for example suitable for use with the above-mentioned wave guides which have been generated by titanium diffusion or proton exchange in lithium niobate crystals or by doting III–V semi-conductors. Finally, in particular in connection with the first embodiment, light guide fibers have been described as wave guides between the interferometer and the photodetectors. Is is, however, also possible to use wave guides like those described in connection with the interferometer chip.

We claim:

1. An interfermometer comprising:

a light source;

a first waveguide formed on a substrate, the first waveguide splitting at a first location into a first coupler waveguide and a second coupler waveguide and combining at a second location to form a measuring arm;

a phase modulator coupled to the measuring arm portion of the first waveguide;

a second waveguide formed on the substrate, a portion of the second waveguide positioned adjacent to the first coupler waveguide, the second waveguide forming a first reference arm;

a third waveguide formed on the substrate, a portion of the third waveguide positioned adjacent to the second coupler waveguide, the third waveguide forming a second reference arm, the first reference arm having an optical path length different from the path length of the second reference arm;

means for guiding a beam of light from the light source to the first waveguide, the light being coupled into the second and third waveguides by the first and second coupler waveguides wherein the light traveling through the first and second reference arms of the second and third waveguides is reflected back through the second and third waveguides and brought into interference with light in the measuring arm reflected back from an object;

a plurality of detectors coupled to the second and third waveguides for detecting the interference signals; and an evaluation circuit coupled to the plurality of detectors for detecting a change in optical path length and the direction of change, wherein the first, second and third waveguides are formed in a substrate by ion exchange.

2. An interferometer comprising:

a light source;

a first waveguide formed on a substrate, the first waveguide splitting at a first location into a first coupler waveguide and a second coupler waveguide and combining at a second location to form a measuring arm;

a phase modulator coupled to the measuring arm portion of the first waveguide;

a second waveguide formed on the substrate, a portion of the second waveguide positioned adjacent to the first coupler waveguide, the second waveguide forming a first reference arm;

a third waveguide formed on the substrate, a portion of the third waveguide positioned adjacent to the second coupler waveguide, the third waveguide forming a second reference arm, the first reference arm having an optical path length different from the path length of the second reference arm;

means for guiding a beam of light from the light source to the first waveguide, the light being coupled into the second and third waveguides by the first and second coupler waveguides wherein the light traveling through the first and second reference arms of the second and third waveguides is reflected back through the second and third waveguides and brought into interference with light in the measuring arm reflected back from an object;

a plurality of detectors coupled to the second and third waveguides for detecting the interference signals;

an evaluation circuit coupled to the plurality of detectors for detecting a change in optical path length and the direction of change;

a plurality of amplifiers coupled to the plurality of detectors, a plurality of pulse generators coupled to the amplifiers, a driving unit coupled to the phase modulator, a direction discriminator coupled to the pulse generators, a counter coupled to the direction discriminator and a first display unit coupled to the counter;

a function generator coupled to the driving unit for driving the phase modulator, a phase meter coupled to the function generator and to one of the detectors and a second display unit coupled to the phase meter; and a memory coupled to the output of the function generator, the memory also being coupled to an output of the counter and an input of the first display.

3. An interferometer according to claim 2 wherein the function generator generates saw-tooth signals to control the phase modulator and the phase between the saw-tooth signal and the signal from the one detector is measured in the phase meter and displayed on the second display.

4. An interferometer according to claim 2 wherein the function generator generates a stepped digital modulation signal having a 2 Pi phase rotation within one period.

5. An interferometer according to claim 2 wherein the function generator generates a digital signal which runs in a meander shape about a saw-tooth curve.

6. An interferometer according to claim 2 wherein the function generator generates a signal having a frequency of one (1) kiloHertz.

7. A method for determining the change in optical path length and the direction in change using an interferometer, comprising the steps of:

guiding light from a light source in a measuring arm, a first reference arm and a second reference arm, the first and second reference arms having different optical path lengths;

interfering the light guided in the measuring arm with light guided in the first and second references arms;

modulating the light guided in the measuring arm by providing a phase modulator at the measuring arm;

detecting the interference between the light guided in the measuring arm and the light guided in the first and second reference arms; and applying the detected signals to an evaluation unit, wherein the step of modulating the light beam in the measuring arm includes one of either adjusting a potentiometer and by a programmable controller.

* * * * *